United States Patent Office 2,982,257
Patented May 2, 1961

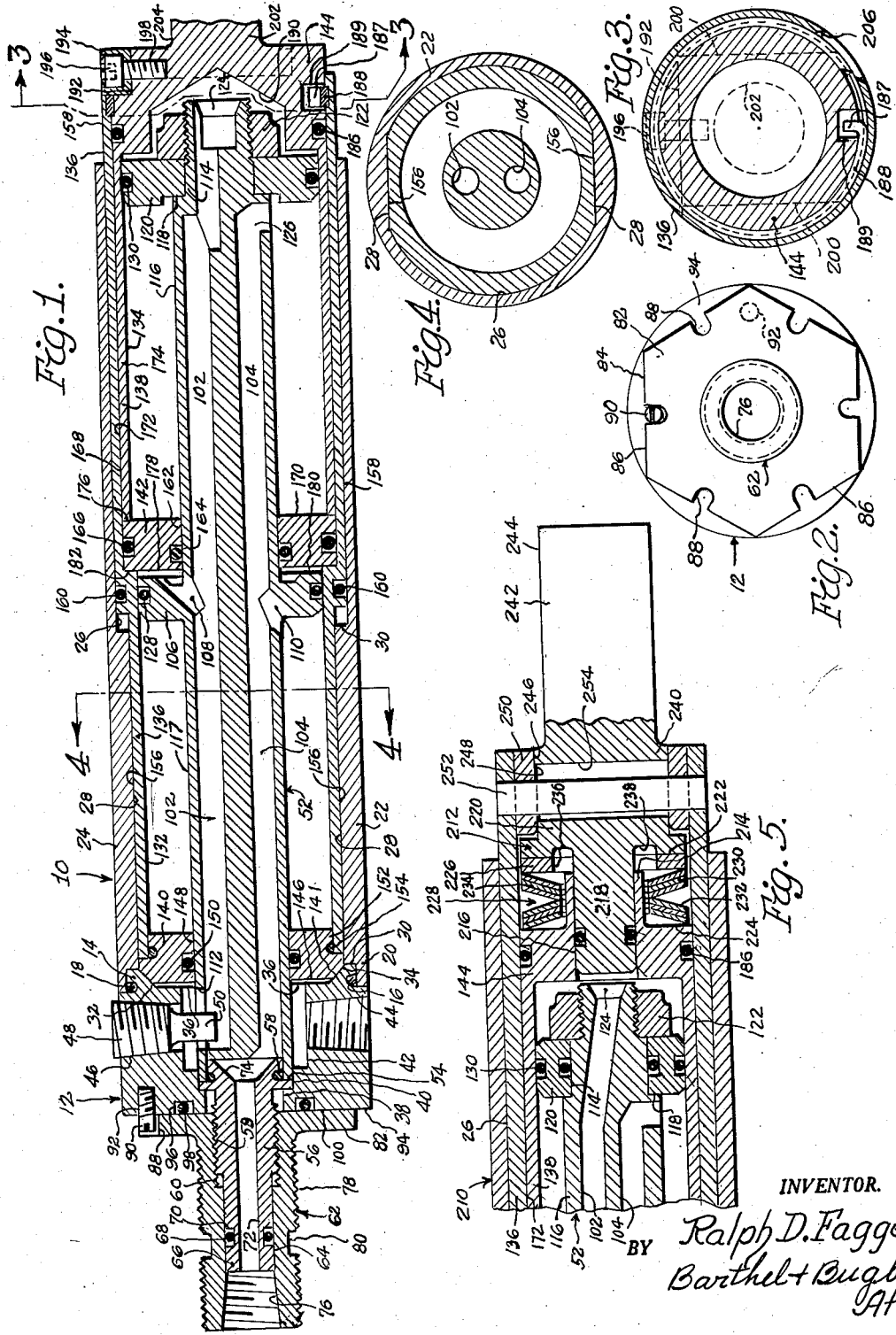

2,982,257

NON-ROTATING MULTIPLE-PISTON CYLINDER FOR FIXTURE-MOUNTED SPOT WELDING GUN

Ralph D. Fagge, 4021 E. Outer Drive, Detroit, Mich.; Sophie A. Fagge, administratrix of said Ralph D. Fagge, deceased Filed Dec. 3, 1956, Ser. No. 625,969

5 Claims. (Cl. 121—38)

This invention relates to spot welding guns and, in particular, to fixture-mounted spot welding guns.

Hitherto, spot welding of fabricated or built-up workpieces known as weldments requiring multiple welds to secure their parts together has been frequently carried out by means of fixtures upon which fixed welding guns are mounted in suitable positions to perform the multiple welds upon the particular workpieces. These fixture-mounted spot welding guns are required not only to carry welding electrodes but also to reciprocate these electrodes rapidly into and out of engagement with the workpiece parts with a powerful compressing force while the welds are being made. The motive devices for so moving the welding electrodes generally consist either of compressed air or hydraulic reciprocatory motors including cylinders with pistons reciprocating therein and carrying the electrodes on their piston rods.

Where, as is frequently the case, workpieces for reasons of structural strength or tightness require spot welds to be made close to one another, it has hitherto been impossible to mount such reciprocatory motors sufficiently close together and at the same time obtain sufficiently powerful thrusts to achieve proper welding results without employing compressed air or hydraulic pressure fluid under excessively high and therefore dangerous pressures which are not only hazardous to the operators but also destructive of apparatus and incurring high repair and upkeep costs. In other words, with the specified distance between the adjacent welds of the multiple weld assembly it has hitherto been difficult and impractical if not impossible to provide sufficiently powerful thrusts for this purpose with ordinarily available compressed air and hydraulic pressures because of the dimensional limits placed upon the diameters of the pistons in the hydraulic or compressed air motors by the close-together spacing of the adjacent welds. Furthermore, it has hitherto been difficult to provide such a reciprocatory pressure fluid motor with a sufficiently long stroke to provide sufficient working space for easily moving the workpiece into and out of the welding zone in the welding fixture, especially under automation set-ups where the positioning of the workpiece as well as its conveying into and out of the welding zone is performed automatically by machinery rather than manually by skilled workmen.

The present invention solves this problem by providing a fixture-mounted spot welding gun which has a small diameter cylinder, yet an unusually powerful thrust adequate to force the most exacting of workpieces together with a sufficiently powerful clamping action yet enable the making of closely-spaced multiple welds incapable of being made under the same clamping pressure by previous fixture-mounted spot welding guns.

Accordingly, one object of the present invention is to provide a fixture-mounted spot welding gun which has an unusually small outside diameter accompanied by an exceptionally large piston area adapted to exert an unusually powerful thrust upon the welding electrode while welding is being carried out.

Another object is to provide a fixture-mounted spot welding gun of the foregoing character wherein the large piston area is achieved by the provision of multiple pistons arranged in tandem within the cylinder of the reciprocating fluid pressure motor, the overall diameter of each individual piston being small but their cumulative effect being large, so that ordinarily available compressed air and hydraulic pressures are adequate to produce the most powerful thrusts desired for such work.

Another object is to provide a fixture-mounted spot welding gun of the foregoing character having three pistons which are coupled to one another within the cylinder so as to be movable substantially simultaneously relatively to stationary pistons forming abutments against which the pressure fluid acts in exerting its push against the movable pistons.

Another object is to provide a fixture-mounted spot welding gun of the foregoing character which is composed of parts capable of being manufactured at relatively low cost and assembled with a minimum of labor and other expense.

Another object is to provide a fixture-mounted spot welding gun of the foregoing character having simple and effective means for preventing rotation of the piston within the cylinder.

Another object is to provide a fixture-mounted spot welding gun of the foregoing character whereby means is provided for exerting a mechanical rapid-acting follow-up squeezing action as the electrode moves under the welding heat and pressure, where inelastic hydraulic pressure fluid is the motive pressure fluid for the reciprocatory motor.

Other objects and advantages of the invention will become apparent during the course of the following description of the accompanying drawings, wherein:

Figure 1 is a central longitudinal vertical section through a fixture-mounted spot welding gun according to one form of the invention, adapted to employ compressed air as the motive fluid, with the electrode-carrying stem broken off to conserve space;

Figure 2 is a left-hand elevation of the welding gun shown in Figure 1;

Figure 3 is a vertical cross-section through the spot welding gun of Figure 1, taken along the line 3—3 therein;

Figure 4 is a cross-section taken along the line 4—4 in Figure 1, showing the means for preventing rotation of the hollow movable outer piston relatively to the cylinder; and Figure 5 is a central vertical longitudinal section through the forward end of a modified fixture-mounted spot welding gun, according to the invention, adapted to employ hydraulic pressure fluid as the motive fluid, and equipped with rapid-acting mechanical follow-up mechanism, shown in its follow-up position.

Referring to the drawings in detail, Figure 1 shows a fixture-mounted spot welding gun, generally designated 10, especially adapted for use with an elastic working fluid, such as compressed air and adapted to be mounted in closely-spaced multiples upon a welding fixture (not shown) set up for making closely-spaced multiple welds upon a workpiece (not shown). Such a workpiece may consist, for example, of two or more steel panels which it is desired to weld together at closely-spaced intervals such as railway car bodies either of freight or passenger types, sheet metal containers or reservoirs, automotive vehicles, agricultural machinery, aircraft, prefabricated buildings or the like.

The welding gun 10 is provided with an outer cylinder head 12 which is equipped with an annular smaller diameter concentric flange 14 equipped with a groove 16 of roughly U-shaped crosssection adapted to receive a ring 18 of metal brazing wire which, together with the flange 14, engages the inner surface of the annularly stepped end portion 20 of an outer cylinder barrel 22, the parts being united by heat applied to the zone adjacent the brazing ring 18 to solidly unite them into an outer cylinder, generally designated 24. The cylinder barrel 22 is provided with a mainly cylindrical bore 26, the rearward portion of which has flat parallel guide surfaces 28 (Figure 4) extending longitudinally therealong to intermediate shoulders 30. In Figure 1, the cylinder barrel 22 is shown for purposes of simplicity as made in a single piece from end to end, whereas in practice, it is manufactured in forward and rearward halves welded together at the plane through the shoulders 30, in order to simplify the flat surfaces 28 in the rearward half.

The outer cylinder head 12 is provided with a partly tapered end or abutment surface 32 with an outer conical portion 34 and an inner radial portion 36, the former acting as a stop surface for an inner cylinder, as explained below. The outer piston head is provided with stepped bores 38, 40 and 42 of successively increasing diameters, the bore 42 having a pair of diametrically opposite radial threaded ports 44 and 46 communicating therewith. The port 44 is a service port for the intake or discharge of pressure fluid, particularly compressed air, for which purpose it has a service pipe coupling (not shown) threaded therein, whereas the port 46 has threaded therein a correspondingly-threaded stop plug 48 with a smaller diameter unthreaded nose 50 projecting radially inward therefrom.

Seated in the intermediate bore 40 between the stepped bores 38 and 42 is a stationary hollow shaft 52 which abuts the flanged annularly-grooved end portion 54 of a threaded hollow stem 56, a union between the stem 56 and rod or shaft 52 being effected by means of a brazing ring 58 seated in the groove of the stem end portion 54 and united thereto by the application of heat in a manner similar to that described above in connection with the uniting of the cylinder barrel 22 to the cylinder head 12.

The stem 56 is threaded as at 59 to enter a correspondingly threaded counterbore 60 in a flanged tubular support 62 having an axial bore 64 snugly receiving the reduced diameter nose portion 66 of the steam 56, a sealing junction therebetween being provided by a conventional O-ring 68 of elastic deformable material, such as rubber or synthetic rubber or plastic mounted for axial motion in an annular groove 70. The stem 56 has a longitudinal bore 72 terminating at its forward end in a flared portion 74 and its rearward end communicates with a threaded fluid service port 76 in the outer end of the flanged tubular support 62 which serves as the second service port of the gun 10 in cooperation with the first service port 44 and similarly receives a pipe coupling (not shown) for the second fluid service pipe (also not shown). The flanged tubular support 62 is provided with an external thread 78 which is interrupted by an annular groove 80 intermediate its opposite ends. The flange 82 of the tubular support 62 has a periphery 84 of polygonal outline with sides 86, a hexagon being a convenient shape (Figure 2). The sides 86 are provided with notches 88 of U-shaped cross-section, one of which is adapted to receive a headless set screw 90 threaded into a threaded axial hole 92 (Figure 1) in the cylinder head 12. The latter is provided in its face 94 with an annular groove 96 adapted to receive an O-ring 98 similar to the O-ring 68 and for a similar sealing purpose to seal the junction between the end surfaces 94 and 100 of the outer cylinder head 12 and stem flange 82 respectively.

The hollow shaft 52 is provided with a pair of parallel longitudinal bores or fluid service passageways 102 and 104 respectively and also with a stationary intermediate abutment piston head 106 integral therewith and having inclined passageways 108 and 110 respectively leading from the passageways 102 and 104 to the spaces on opposite sides of the intermediate stationary piston head 106. The passageway 102 at its rearward end communicates with an elongated slot 112 which has a width snugly receiving the nose portion 50 of the stop plug 48 and a length axially sufficient to permit free flow of fluid between the service port 44, bore 42 and the passageway 102, while the stop plug 48 prevents relative rotation of the hollow shaft 52 within the outer cylinder head 12. The other passageway 104 at its rearward end communicates with the flared forward or inner portion 74 of the passageway 72 in the stem 56, and thence with the service port 76.

The hollow shaft 52 on opposite sides of its stationary piston head 106 has forward and rearward outer cylindrical surfaces 116 and 117 provided with a reduced diameter partly threaded end portion 114 separated from the cylindrical outer surface 116 of the piston rod 52 by an annular shoulder 118. Mounted on the reduced diameter portion 114 and in abutment with the annular shoulder 118 is a forward stationary abutment piston head 120 held in place against the shoulder 118 by a nut 122 threaded upon the threaded portion of the end portion 114. A longitudinal flared port 124 communicates with the upper fluid passageway 102 at the end thereof to permit fluid to pass to and from the forward side of the forward stationary piston head 120 whereas a radial port 126 placed rearwardly of the stationary forward piston head 120 communicates with the lower or second fluid passageway 104 behind the stationary forward piston head 120.

The stationary intermediate and forward piston heads 106 and 120 are peripherally grooved to receive conventional O-rings 128 and 130 respectively disposed in immediate sealing engagement with the intermediate and inner bores 132 and 134 respectively of rearward and forward tubular piston rods 136 and 138 respectively provided with rearward and forward piston heads 140 and 144 and collectively forming outer and inner cupped pistons respectively. An intermediate free piston head 142 is reciprocably mounted on the shaft 52 between the fixed heads 106 and 120 thereof. The piston head 140 has a conical or beveled rearward edge portion 141 engageable with the conical internal edge portion 34 of the cylinder head 12 as a stop, the dimensions being so chosen as to space its rearward face 146 a short distance away from the adjacent radial forward face 36 of the cylinder head 12 to permit the pressure fluid to reach the piston face 146. The rearward movable piston 140 is provided with a bore 148 closely fitting but slidably engaging the rearward outer surface 116 of the hollow shaft 52, the bore 148 being internally grooved to receive a resilient conventional O-ring 150 for sealing the junction between it and the outer rearward surface 117 of the hollow shaft 52.

The rearward movable piston head 140 is provided with an annularly stepped reduced diameter peripheral portion 152 which is annularly grooved to receive a brazing ring 154 by which it is secured by the application of heat to the inner end of the rearward tubular piston rod 136 when the inner surface or bore 132 thereof is slipped over the reduced diameter portion 152 which is dimensioned to fit it. The tubular piston rod 136 rearwardly of the fixed intermediate piston head 106 is provided with parallel flat guide surfaces 156 slidably fitting the parallel flat guide surfaces 28 at the rearward end of the bore 26 of the cylinder barrel 22. The forward portion of the tubular piston rod 136 is provided with an outer cylindrical surface 158 slidably fitting the generally cylindrical bore 26 and grooved intermediate its ends to receive a conventional resilient O-ring 160 to prevent leakage between the bore 26 and the tubular piston rod outer surface 158.

The free piston head 142 slidably mounted on the forward external cylindrical surface 116 of the hollow shaft 52 is provided with a central bore 162 which snugly but slidably fits the forward surface 116 and which is internally grooved to receive a conventional O-ring 164 for preventing leakage therebetween. The periphery of the free piston 142 is also annularly grooved to receive a conventional O-ring 166 by which leakage is prevented between it and the outer or forward cylinder bore 168 in the forward portion of the tubular piston rod 136. Slidably mounted in the cylindrical cylinder bore 168 independently of and separable from the forward surface 170 of the free piston 142, which it abuttingly engages, is the outer cylindrical surface 172 of a forward tubular piston rod 174, the rearward end 176 of which abuttingly engages the forward surface 170 of the free piston 142, the rearward surface 178 of which is spaced axially a short distance apart from the forward surface 180 of the fixed piston head 106 by an annular stop shoulder 182 disposed between the cylindrical bores 132 and 172 so as to permit access of pressure fluid through the passageway 108 to the major part of the rearward surface 178 of the free piston 142.

The forward piston head 144 is externally grooved to receive a conventional O-ring 186 for the prevention of leakage between the external surface 172 of the tubular piston rod 138 and the bore 168 of the tubular piston rod 136. The tubular piston rods 136 and 138 are internally and externally annularly grooved opposite one another to receive a flexible coupling band 188 by which they are caused to move back and forth as a unit. The coupling band 188 is provided at one end with a hook 187, which is engaged in a socket 189 in the head 144. The forward piston head 144 is provided with an annularly-stepped internal piston surface 190 and a chordal rabbet or recess 192 into which is fitted a segment-shaped retaining member 194 which is drilled for the passage of a set screw 196, the latter being threaded into a radial threaded hole 198 in the forward piston head 144. The piston head 144 at its outer end is provided with flat parallel sides 200 (Figure 3) for receiving a conventional wrench, and is also provided with an axially-projecting longitudinal stem or welding electrode holder 202 having a cylindrical outer surface 204 upon which a conventional movable electrode (not shown) is mounted.

A peripherally-elongated aperture 206 is provided in the forward end of the tubular piston rod 136 (Figure 3) for the insertion of the coupling band 188. The latter is installed by rotating the outer tubular piston rod 136 and forward piston head 144 relatively to one another by means of a wrench applied to the flat sides 200 of the latter until the aperture 206 and socket 189 are in alignment with one another. The hooked end 187 of the coupling band 188 is then inserted through the aperture 206 into the socket 189 and the forward piston head 144 rotated by means of the wrench (Figure 3) so as to drag the remainder of the band 188 through the aperture 260 behind the hooked portion 187 into the aligned annular facing grooves in the piston head 144 and piston rod 136 respectively. When these parts have been rotated relatively to one another by nearly a complete revolution, the rearward end of the coupling band 188 drops through the aperture 206 and the parts then occupy the relative positions shown in Figure 3.

To disassemble these parts, they are rotated in the reverse direction so as to cause the beveled rearward end of the coupling band 188 to engage the correspondingly beveled end of the aperture 206 and push its way out through the aperture 206. Rotation is continued until the socket 189 again comes into alignment beneath the aperture 206 and substantially the entire length of the coupling band 188 has been pushed outward through the aperture 206, whereupon the hooked end 187 of the coupling band 188 may then be disengaged from the socket 189 and the coupling band 188 completely removed. The coupling band 188 is of a flexible metal which can be threaded through the aperture 206 into an arcuate path, brass being found suitable for the material of this coupling band.

The modified fixture-mounted welding gun, generally designated 210, of which only the forward portion is shown (Figure 5) is especially adapted for use with an inelastic working fluid, such as hydraulic pressure fluid. Except for this forward end portion it is similar in construction to the welding gun 10 of Figures 1 to 4 inclusive. The forward end is provided with a follow-up thrust device, generally designated 212, to provide for an elasticity which is present in compressed air but absent in pressurized hydraulic fluid, because of the inelastic character of the latter. Except for the follow-up thrust device 212, therefore, the parts to the left thereof are substantially identical with the corresponding parts in Figure 1, and consequently are designated with the same reference numerals. In Figure 5, however, the forward piston head 144 is provided with a reduced diameter tubular extension 214 and also with a central bore 216 extending through the piston head 184.

Slidably mounted in the bore 214 is the plunger stem 218 of an abutment head or electrode holder 220 having an abutment surface 222 facing an abutment surface 224 on the forward side of the piston head 184. Mounted in the annular space thus provided between the surface 224 and an abutment washer 226 engaging the surface 222 is a thrust washer assembly, generally designated 228, consisting of opposed sets 230 and 232 of oppositely-facing convexo-concave spring thrust washers 234 commonly known in the mechanical arts under the trade name of Belleville spring washers. The inner or central hole 236 in the thrust washer 226 is sufficiently large and the rearward surface 222 of the abutment head 220 sufficiently undercut centrally at 238 to provide clearance for the forward motion of the tubular extension 214. Since different numbers of spring thrust washers 234 may be used, according to the particular thrust desired to be exerted in the particular installation, abutment washers 226 of correspondingly different thicknesses are used to fill up the space in front of the washers 234.

Extending forwardly from the forward end of the abutment head or electrode holder 220 is a connecting portion 240 of intermediate diameter leading to a reduced diameter stem 242 analogous to the stem 202 of Figure 1 and having an outer cylindrical surface 244 for the similar purpose of holding a movable welding electrode (not shown). The connecting portion 240 has an outer cylindrical surface 246 which slidably engages the bore 248 in a bearing sleeve 250. The bearing sleeve 250 is mounted in the extreme forward end of the bore 172, and it and the forward end of the tubular piston rod 136 are drilled in alignment diametrically to receive a retaining pin 252 which also passes through an axially-elongated slot 254 in the connecting portion 240.

Operation of compressed air welding gun

In the operation of the fixture type compressed air spot welding gun 10 of Figures 1 to 4 inclusive, as well as that of its hydraulic modification 210 of Figure 5, let it be assumed that the gun 10 or 210 is connected through a conventional compressed air or hydraulic circuit (not shown) to an air compressor or hydraulic pump respectively (not shown) by way of a conventional electronically-controlled valve which rapidly reverses the flow of working fluid to the gun as much as several hundred times per minute, so as to impart correspondingly rapid reciprocation to the piston thereof. These circuits and their components are well known to engineers skilled in the spot welding art and their details are beyond the scope of the present invention. Let is also be assumed that the welding gun 10 or 210 has been mounted, by means of its threaded stem 62 (Figure 1), in a welding fixture in spaced relationship with other welding guns of the same type and similarly connected to the above-mentioned compressed air of hydraulic circuits.

Considering first the operation of the compressed air welding gun 10 (Figures 1 to 4 inclusive), let it be assumed that at a given instant, because of the instantaneous position of the control valve (not shown), compressed air is being supplied to the service port 44 while at the same time the service port 76 is connected to exhaust into the atmosphere. Under these circumstances, compressed air flows through the service port 44, annular chamber 42 and elongated slot 112 at the left-hand end of Figure 1 into the longitudinal passageway 102 in the hollow stem 52. The compressed air reaching the annular chamber 42 acts directly against the rearward face 146 of the rearward movable piston 140, moving it and its tubular piston rod 136 forwardly to the right. At the same time, compressed air reaching the rearward face 178 of the free piston 142 from the passageway 102 through the passageway 108 moves the free piston 142 forwardly to the right, and with it the tubular inner piston rod 138, the combined motions of the outer and inner tubular piston rods 136 and 138 being synchronized through the action of their common split coupling band 188 to move the forward piston head 144 and electrode-mounting stem 202 forwardly to the right. This action is further assisted by compressed air reaching the rearward face 190 of the forward piston head 144 on the tubular piston rod 138 from the passageway 102 through the end port or passageway 124. During this action, the inner or forward surface 32 of the cylinder head 12 acts as an abutment for the compressed air moving the piston head 140, whereas the fixed piston heads 106 and 120 on the hollow shaft 52 similarly serve as abutments for the compressed air acting against the free piston 142 and forward piston head 144.

In the meantime, while the piston heads 140, 142 and 144 are being moved forwardly to the right under the action of compressed air reaching them through the service port 44, longitudinal passageway 102 and its connecting passageways 112, 108 and 124, air trapped on the opposite or forward side of the rearward piston 140 is discharged through the port 110 and passageways 104 and 72 through the service port 76 into the atmosphere. At the same time, air trapped forwardly of the free piston head 142 is similarly exhausted through the port 126 into the forward end of the passageway 104 and thence into the atmosphere. There is, of course, no air trapped forwardly of the forward piston 144 because its forward face is in the atmosphere itself.

The consequent forward motion of the stem 202 and the movable electrode mounted thereon forces the movable electrode against the workpiece parts to be welded and thrusts the latter into engagement with the fixed electrode as an abutment, at the same time a welding current being passed through the electrodes to perform a spot weld at the location on the workpiece then engaged by the electrodes. The elasticity of the compressed air provides a follow-up movement of the electrode as the metal softens under the welding heat.

Upon reversal of the control valve in the compressed air circuit (not shown), compressed air is supplied to the service port 76 at the left-hand or rearward end of the welding gun 10 and the service port 44 is connected to exhaust to the atmosphere. Under these conditions, compressed air flows through the passageway 72 into the passageway 104 of the hollow stem 52, thence through the ports 110 and 126 into the space forwardly of the rearward piston head 140 and free piston head 142, moving these piston heads rearwardly to the left. Their motion carries with them the outer tubular piston rod 136 and, through its connection by the coupling ring 188, the inner tubular piston rod 138 and the forward piston head 144, retracting the latter together with the electrode-mounting stem 202 and the movable electrode carried thereby. This action releases the workpieces for travel to the next welding position, whereupon the foregoing action is repeated. In practice, this action and reversal of flow of compressed air occurs as rapidly as several hundred times a minute, giving a rapid hammering action of the movable electrode on the work as welding takes place. The fact that the compressed air used as the working fluid is an elastic fluid provides a squeezing follow-up action as the metal softens under the action of the electric welding current, resulting in a highly efficient and effective welding action.

Operation of hydraulic welding gun

In the operation of the hydraulic welding gun 210 of Figure 5, the gun 210 is connected through its service ports 44 and 76 to a conventional hydraulic pump by way of a conventional hydraulic circuit containing a conventional control valve, such as an electronically-operated control valve known to hydraulic and welding engineers, and outside the scope of the present invention. The flow of hydraulic fluid in the welding gun 210 is the same as that described above in connection with Figure 1 for compressed air, except that the hydraulic fluid discharged either through the service port 76 or through the service port 44 returns to the hyradulic pump by way of the control valve. Figure 5 shows the relative positions of the parts after the follow-up action has taken place following the softening of the metal in response to the welding heat.

The forward motion of the rearward, intermediate and forward piston heads 140, 142 and 144 and their tubular piston rods 136 and 138 causes the cross-pin 252 to engage the forward end of the slot 254 and move the abutment head 220 and the electrode carried by its stem 242 forwardly into engagement with the work. The welding current then flows and welding takes place in the usual way with the welding heat softening the metal. However, since hydraulic pressure fluid is not an elastic fluid, like compressed air, it lacks the rapid follow-up squeezing action which compressed air provides in the welding gun 10, hence the follow-up device 228 now comes into action to provide a substitute mechanical follow-up squeezing action.

The operation of the follow-up device 228 occurs in the following manner. When, in response to the application of hydraulic pressure fluid to the left-hand or rearward sides of the piston heads 140, 142 and 144, the head 144 is moved to the right, together with the outer tubular piston rod 136, the action of the head 144 against the spring washers 234 of the opposed sets 230 and 232 compresses these washers. This compression immediately results in a reaction against the thrust washer 226 and the abutment head 220, which in turn transmits the forward motion to the pin 252 by the engagement of the rearward end of the slot 254 therewith. This action in turn imparts a follow-up thrust to the electrode-carrying stem 242 and the movable electrode mounted thereon, as the metal softens during welding. In this manner, the hydraulic welding gun 210 is provided with a follow-up action of a mechanical nature simulating the action of the elastic pressure fluid (compressed air) in the welding gun 10 of Figures 1 to 4 inclusive.

In either of the welding guns 10 or 210, relative rotation between the outer piston rod 136 and the outer cylinder 24 is prevented by the sliding engagement of the flat surfaces 28 and 156 with one another (Figure 4). This prevention of rotation is maintained on the electrode-carrying stems 202 and 242 by the connections thereof of the outer tubular piston rod 136 either through the screw 196 and arcuate key 194 of Figure 1 or through the transverse pin 252 of Figure 5. In either case, the internal parts of the welding guns 10 and 210 are prevented from rotating relatively to one another during action, notwithstanding the excessive vibration set up in these guns by the extremely rapid reciprocation of their components.

What I claim is:

1. A fixture-mounted spot welding gun comprising a cylinder having an outer bore with a first fluid service port communicating therewith, an outer cupped piston reciprocably mounted in said outer bore with its head disposed near the rearward end of said cylinder and having and intermediate bore therein, an inner cupped piston reciprocably mounted in said intermediate bore with its head disposed near the forward end of said cylinder and having an inner bore therein, an intermediate piston reciprocably mounted in said intermediate bore rearwardly of said inner piston, said pistons having aligned central apertures in the heads thereof, a hollow shaft projecting from one end of said cylinder through said apertures and having axially-spaced abutment heads engaging said intermediate and inner bores respectively, said shaft having fluid service passageways therethrough communicating with said intermediate and inner bores on opposite sides of said abutment heads with a second fluid service port communicating with one of said passageways, a welding electrode holder, means for drivingly coupling said outer piston to said welding electrode holder, said hollow shaft having an elongated opening extending from the exterior thereof into one of said passageways, and a rotation-preventing element mounted in said cylinder and projecting inwardly from said cylinder into said shaft opening transversely of the axis of said cylinder and providing a residual fluid flow space through said opening to one side of said element.

2. A fixture-mounted spot welding gun comprising a cylinder having an outer bore with a first fluid service port communicating therewith, an outer cupped piston reciprocably mounted in said outer bore with its head disposed near the rearward end of said cylinder and having an intermediate bore therein, an inner cupped piston reciprocably mounted in said intermediate bore with its head disposed near the forward end of said cylinder and having an inner bore there, an intermediate piston reciprocably mounted in said intermediate bore rearwardly of said inner piston, said pistons having aligned central apertures in the heads thereof, a hollow shaft projecting from one end of said cylinder through said apertures and having axially-spaced abutment heads engaging said intermediate and inner bores respectively, said shaft having fluid service passageways therethrough communicating with said intermediate and inner bores on opposite sides of said abutment heads with a second fluid service port communicating with one of said passageways, a welding electrode holder, means for drivingly coupling said outer piston to said welding electrode holder, said outer and inner pistons having aligned facing annular grooves therein, said inner piston having a recess communicating with its respective groove, an elongated flexible coupling member disposed partly in one groove and partly in the other groove and having an end projection seated in said recess, the head of said inner piston having an approximately segmental periperal cutaway portion therein, and an approximately segmental retaining member removably secured in said cutaway portion.

3. A fixture-mounted spot welding gun comprsing a cylinder having an outer bore with a first fluid service port communicating therewith, an outer cupped piston reciprocably mounted in said outer bore with its head disposed near the rearward end of said cylinder and having an intermediate bore therein, an inner cupped piston reciprocably mounted in said intermediate bore with its head disposed near the forward end of said cylinder and having an inner bore therein, an intermediate piston reciprocably mounted in said intermediate bore rearwardly of said inner piston, said pistons having aligned central apertures in the heads thereof, a hollow shaft projecting from one end of said cylinder through said apertures and having axially-spaced abutment heads engaging said intermediate and inner bores respectively, said shaft having fluid service passageways therethrough communicating with said intermediate and inner bores on opposite sides of said abutment heads with a second fluid service port communicating with one of said passageways, a welding electrode holder, means for drivingly coupling said outer piston to said welding electrode holder, said inner piston head having an axially-extending guide portion, said electrode holder having a guided portion relatively slidably engaging said guide portion, for providing lost motion therebetween, and a convexo-concave resilient washer interposed between said inner piston head and said electrode holder in lost-motion-takeup relationship therewith.

4. A fixture-mounted spot welding gun comprising a cylinder having an outer bore with a first fluid service port communicating therewith, an outer cupped piston reciprocably mounted in said outer bore with its head disposed near the rearward end of said cylinder and having an intermediate bore therein, an inner cupped piston reciprocably mounted in said intermediate bore with its head disposed near the forward end of said cylinder and having an inner bore therein, an intermediate piston reciprocably mounted in said intermediate bore rearwardly of said inner piston, said pistons having aligned central apertures in the heads thereof, a hollow shaft projecting from one end of said cylinder through said apertures and having axially-spaced abutment heads engaging said intermediate and inner bores respectively, said shaft having fluid service pasageways therethrough communicating with said intermediate and inner bores on opposite sides of said abutment heads with a second fluid service port communicating with one of said passageways, a welding electrode holder, means for drivingly coupling said outer piston to said welding electrode holder, said inner piston head having an axially-extending guide portion, said electrode holder having a guided portion relatively slidably engaging said guide portion for providing lost motion therebetween, and a convexo-concave resilient washer interposed between said inner piston head and said electrode holder in lost-motion-takeup relationship therewith, said coupling means including a cross member extending between said outer piston and said electrode holder.

5. A fixture-mounted spot welding gun comprising a cylinder having an outer bore with a first fluid service port communicating therewith, an outer cupped piston reciprocably mounted in said outer bore with its head disposed near the rearward ends of said cylinder and having an intermediate bore therein, an inner cupped piston reciprocably mounted in said intermediate bore with its head disposed near the forward end of said cylinder and having an inner bore therein, an intermediate piston reciprocably mounted in said intermediate bore rearwardly of said inner piston, said pistons having aligned central apertures in the heads thereof, a hollow shaft projecting from one end of said cylinder through said apertures and having axially-spaced abutment heads engaging said intermediate and inner bores respectively, said shaft having fluid service pasageways therethrough communicating with said intermediate and inner bores on opposite sides of said abutment heads with a second fluid service port communicating with one of said passageways, a welding electrode holder, means for drivingly coupling said outer piston to said welding electrode holder, said inner piston head having an axially-extending guide portion, said electrode holder having a guided portion slidably engaging said guide portion, and a resilient element interposed between said inner piston head and said electrode holder, said electrode holder having an axially-elongated transversely-disposed hole therethrough, said cross member extending through said hole in lost-motion engagement with the forward and rearward walls thereof.

References Cited in the file of this patent

UNITED STATES PATENTS

| | | |
|---|---|---|
| 133,373 | Lane | Nov. 26, 1872 |
| 2,064,756 | Janeko | Dec. 15, 1936 |
| 2,383,082 | Rossmann | Aug. 21, 1945 |
| 2,739,571 | Hall | Mar. 27, 1956 |
| 2,851,994 | Fagge | Sept. 16, 1958 |

FOREIGN PATENTS

| | | |
|---|---|---|
| 105,833 | Sweden | Oct. 27, 1942 |